US006450483B1

(12) United States Patent
Baum

(10) Patent No.: US 6,450,483 B1
(45) Date of Patent: Sep. 17, 2002

(54) RODENT GUARD SYSTEM

(76) Inventor: James T. Baum, R.R. 2, Box 108, Elgin, NE (US) 68636

(*) Notice: Subject to any disclaimer, the term of this patent is extended or adjusted under 35 U.S.C. 154(b) by 10 days.

(21) Appl. No.: 09/585,513

(22) Filed: Jun. 1, 2000

(51) Int. Cl.$^7$ .................................................. A01K 3/00

(52) U.S. Cl. ............................... 256/10; 256/1; 256/19; 256/25; 256/65

(58) Field of Search ............................... 256/1, 10, 19, 256/24, 25, 65

(56) References Cited

U.S. PATENT DOCUMENTS

| | | | | | |
|---|---|---|---|---|---|
| 395,678 | A | * | 1/1889 | Wiebrock | |
| 2,187,928 | A | | 1/1940 | Barcroft | 43/59 |
| 2,797,896 | A | * | 7/1957 | Cook | |
| 4,074,456 | A | * | 2/1978 | Tidwell | |
| 4,144,668 | A | * | 3/1979 | Darncharnjitt | |
| 4,205,480 | A | * | 6/1980 | Gartner | |
| 4,497,130 | A | * | 2/1985 | Fitzgerald | |
| 4,546,037 | A | | 10/1985 | King | 428/323 |
| 4,566,219 | A | * | 1/1986 | Firth | |
| 4,709,502 | A | * | 12/1987 | Bierman | |
| 4,747,229 | A | | 5/1988 | Chambers | 43/112 |
| D296,806 | S | | 7/1988 | Bach et al. | D21/143 |
| 4,756,116 | A | | 7/1988 | Cutter | 43/108 |
| 4,839,984 | A | * | 6/1989 | Saunders et al. | |
| 4,869,015 | A | | 9/1989 | Murakami et al. | 43/98 |
| 4,976,063 | A | * | 12/1990 | Young | |
| 5,087,494 | A | * | 2/1992 | Calhoun et al. | |
| 5,107,620 | A | | 4/1992 | Mahan | 43/112 |
| 5,269,091 | A | * | 12/1993 | Johnson et al. | |
| 5,771,641 | A | * | 6/1998 | Morris | |
| 5,918,409 | A | * | 7/1999 | Carnwath | |

* cited by examiner

*Primary Examiner*—Lynne H. Browne
*Assistant Examiner*—Tomlyne A Malcolm
(74) *Attorney, Agent, or Firm*—Thomte, Mazour & Niebergall; Dennis L. Thomte

(57) ABSTRACT

A rodent guard system for inhibiting rodents from entering a predetermined area on a surface comprises a perimeter fence which extends around the predetermined area. The perimeter fence comprises a horizontally disposed barrier member having an upstanding barrier member extending upwardly therefrom. At least one first electrical-conducting member is positioned on the horizontally disposed barrier member between the upstanding barrier member and the outer edge of the horizontally disposed barrier member. At least one second electrical-conducting elongated member is positioned on the upstanding barrier member. The first and second electrical-conducting members are operatively connected to a source of electrical energy whereby the system is operable to complete a circuit across the electrical-conducting members through the rodent's body as the rodent attempts to traverse the barrier members.

26 Claims, 3 Drawing Sheets

RODENT GUARD SYSTEM

BACKGROUND OF THE INVENTION

1. Field of the Invention

This invention relates to a rodent guard system and more particularly to a rodent guard system for inhibiting rodents from entering a predetermined area on a surface. More specifically, the rodent guard system of this invention is designed to prevent rodents from entering an area where bulk grain or bagged seed grain is being stored or a food warehouse where food is stored.

2. Description of the Related Art

In many instances, bags of seed grain, such as corn and soybeans, are stored in large buildings until planting time. In an effort to prevent rodent damage to the bags and seed grain contained therein, mothballs or the like are put in the buildings and, in some cases, cats are also placed in the buildings to prevent rodent damage. Many efforts have been previously made to prevent rodents, bugs, etc., from crossing a boundary, but the previous systems have apparently met with little success. For example, it is believed that in one prior art system spaced-apart electrically conductive wires were taped to the floor of the building and extended around the area or zone where the material to be protected was positioned. However, it is believed that the rodents, by quickly travelling over the electrically conductive wires, were not inhibited from their passage thereover due to the fact that the spaced-apart electrically conductive members did not pose a barrier or did not inhibit the rate of travel of the rodent thereover.

SUMMARY OF THE INVENTION

A rodent guard system for inhibiting rodents or the like from entering a predetermined area on a surface is disclosed which comprises a perimeter fence positioned on the surface and which extends around the predetermined area. The perimeter fence comprises a horizontally disposed barrier member having an upstanding barrier member extending upwardly therefrom. At least one first electrical-conducting member is positioned on the horizontally disposed barrier member between the upstanding barrier member and the outer edge of the horizontally disposed barrier member. At least one second electrical-conducting member is positioned on the upstanding barrier member. A source of electrical energy is operatively connected to the first and second electrical-conducting members so that an electrical current is completed thereacross through a rodent's body as the rodent attempts to traverse the barrier members. The horizontally disposed barrier member and upstanding barrier member form an inverted T-shape. The upper end of the upstanding barrier is included at a 45-degree angle.

It is therefore a principal object of the invention to provide a system for inhibiting rodents or the like from entering a predetermined area on a surface.

Still another object of the invention is to provide a rodent guard system which inhibits rodents from entering a predetermined area on a surface.

Still another object of the invention is to provide a rodent guard system including a horizontally disposed barrier member and an upstanding barrier member which extends upwardly from the horizontally disposed barrier member.

Still another object of the invention is to provide is to provide a rodent guard system which may be quickly assembled and positioned around seed grain or the like which is being stored.

Still another object of the invention is to provide a rodent guard system comprising barrier members which are highly visible.

Still another object of the invention is to provide a rodent guard system which is economical of manufacture and easy to use.

These and other objects will be apparent to those skilled in the art.

DESCRIPTION OF THE PREFERRED EMBODIMENT

Figure 3:
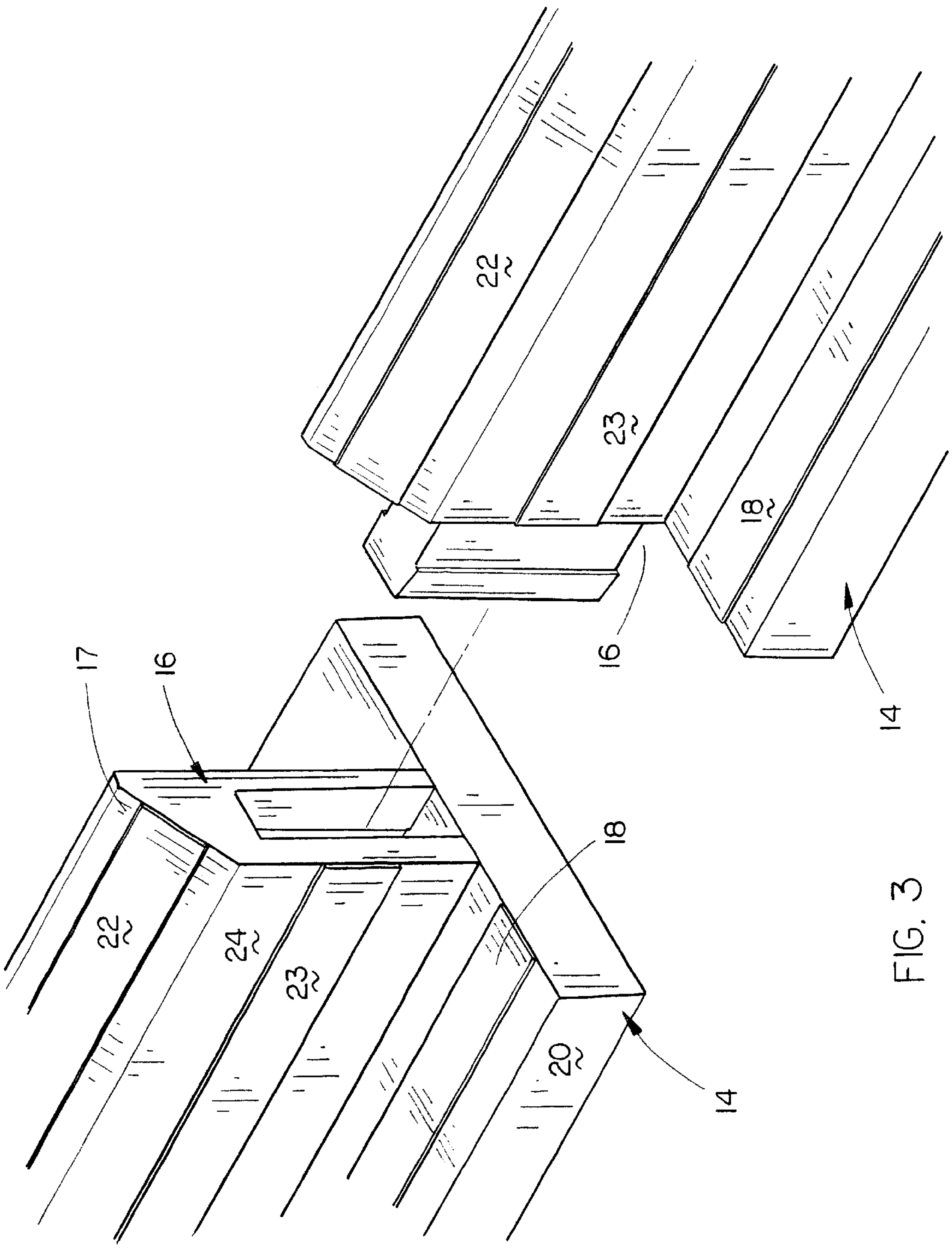
FIG. 3 is a partial exploded perspective view illustrating the manner in which the perimeter fence segments are interconnected.

The numeral 10 refers generally to the rodent guard system of this invention which is designed to be extended around an area 12 wherein bulk grain or bags of seed grain is stored. The system may also be extended around a food warehouse or the like. The rodent guard system of this invention forms a perimeter fence around the area 12 and provides a barrier, which is electrified, to inhibit the passage of rodents or bugs thereover. The guard system of this invention comprises a horizontally disposed barrier 14 having an upstanding barrier 16 extending upwardly therefrom. The barriers 14 and 16 define an inverted T-shape. The barriers 14 and 16 are constructed of an electrically non-conductive material such as rubber, plastic, or the like. Preferably, the upper end 17 of barrier 16 is inclined at a forty-five degree angle, as seen in the drawings. Preferably, the barriers 14 and 16 would be segmented so that they may be secured together in an end-to-end relationship to define the proper perimeter for the area 12, as seen in FIG. 3. Preferably, the barrier members 14 and 16 are constructed of a highly visible material such as fluorescent orange, yellow, red, etc.

A first electrical-conducting, elongated member 18 is positioned on the horizontally disposed barrier member 14 between the upstanding barrier member 16 and the outer edge 20 of the horizontally disposed barrier member 14. At least one second electrical-conducting, elongated member 22 is positioned on the upper end of the upstanding barrier member 16, as seen in the drawings. Any number of the electrical-conducting members 18 may be utilized on the barrier member 14. Similarly, any number of electrical-conducting members 22 may be secured to the upper end of the barrier member 16. Further, one or more electrical-conducting members 23 could be provided on the outer face 24 of the upstanding barrier member 16. Preferably, member 18 is positive and members 22 and 23 are negative.

Figure 1:
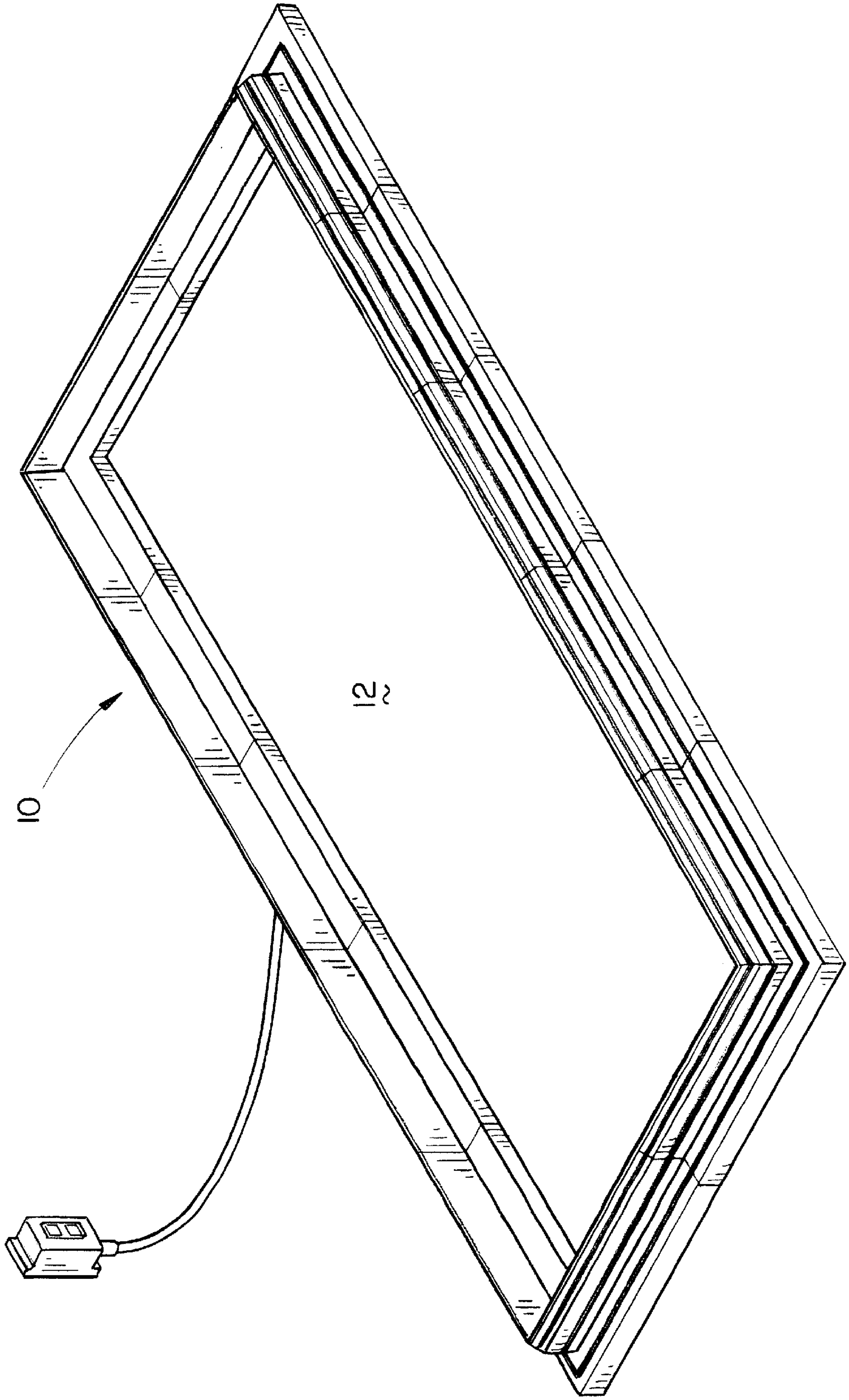
FIG. 1 is a perspective view of the invention.
Figure 2:
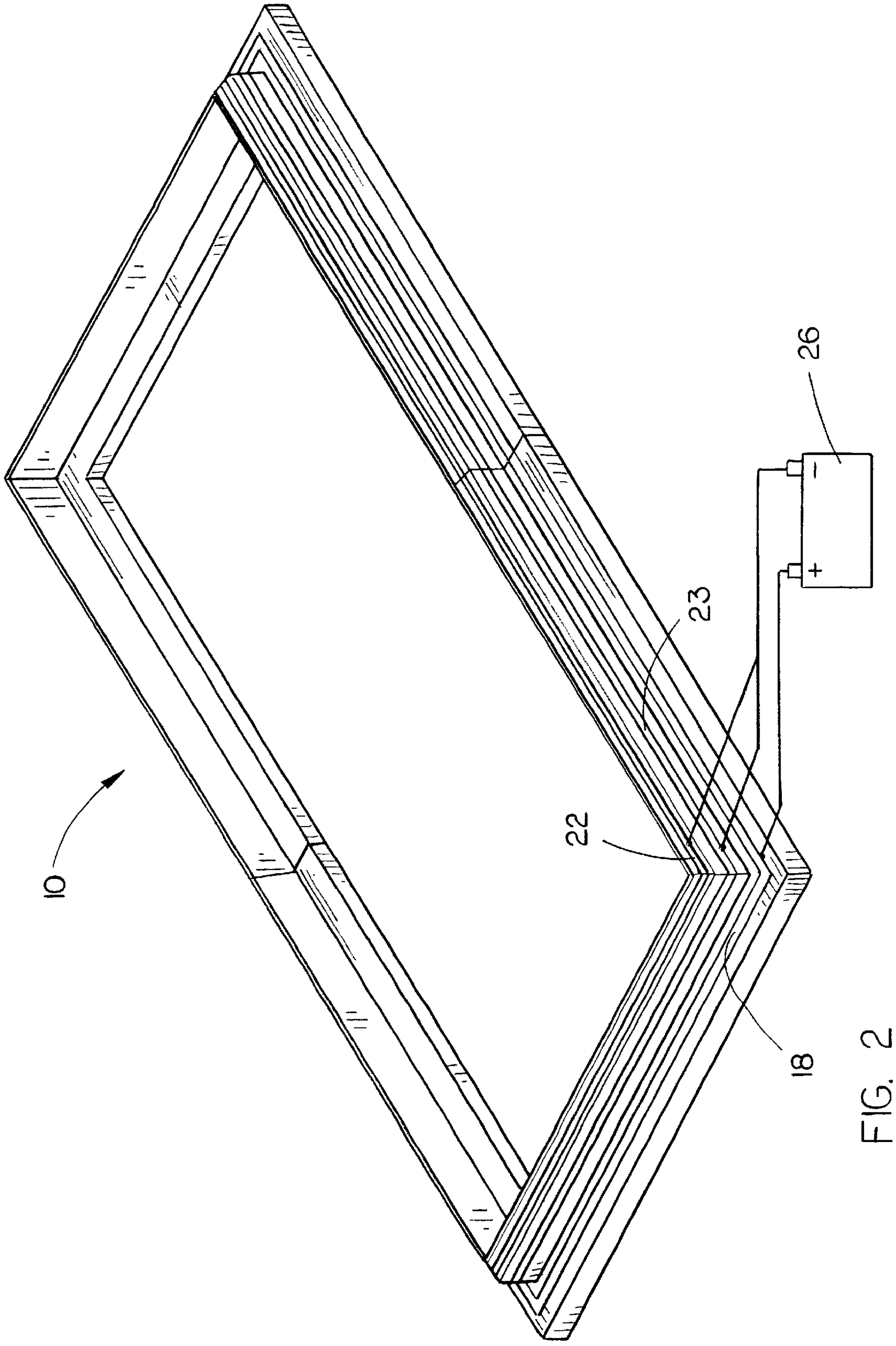
FIG. 2 is a view similar to FIG. 1 except that the system is operated by an electric fence controller and the perimeter fence is comprised of larger segments than in FIG. 1.

The electrical-conducting members 18, 22 and 23 are operatively connected to a source of electrical energy such as a 115 volt AC input, low voltage electric fence controller 26. Although the electric fencers work extremely well, there is a momentary time period between the pulses of electrical energy, as seen in FIG. 1, and it may be advantageous to provide a continuous source of electrical energy through the electrical-conducting members to ensure that a rodent will always be subjected to the electrical energy as the rodent attempts to pass over the barrier members. Preferably, the electrical-conducting members are comprised of a flexible tape, of conventional design, which may be secured to the barrier members.

When a rodent or the like attempts to enter the area 12, its passage is inhibited first by the outer end of the horizontally disposed barrier member 14 and is then further inhibited by the upstanding barrier member 16. As the rodent attempts to pass over the barrier members 14 and 16, the source of electrical energy completes a circuit across the electrical-conducting members 18 and 22, or across members 18 and 23, through the rodent's body to inhibit further movement of the rodent over the perimeter fence.

Thus it can be seen that the invention accomplishes at least all of its stated objectives.

I claim:

1. A rodent guard system for inhibiting rodents from entering a predetermined area on a surface, comprising:

a perimeter fence positioned on the surface and extending around the predetermined area;

said perimeter fence comprising a horizontally disposed barrier member having upper and lower ends, an inner edge, an outer edge, and an upstanding barrier member extending upwardly from said upper end of said horizontally disposed barrier member; said upstanding barrier member having an upper end;

said lower end of said horizontally disposed barrier member positioned on said surface;

at least one first electrical-conducting, elongated member positioned on said horizontally disposed barrier member between said upstanding barrier member and said outer edge of said horizontally disposed barrier member;

at least one second electrical-conducting, elongated member positioned on said upstanding barrier member;

a source of electrical energy operatively electrically connected to said first and second electrical-conducting members;

said first and second electrical-conducting, elongated members spaced along their entire lengths and operable to complete a circuit across said members through a rodent's body as the rodent attempts to traverse the electrical-conducting members on the barrier members.

2. The rodent guard system of claim 1 wherein said barrier members define an inverted T-shape.

3. The rodent guard system of claim 1 wherein said perimeter fence comprises a plurality of fence segments.

4. The rodent guard system of claim 1 wherein said barrier members are comprised of a non-electrical conductive material.

5. The rodent guard system of claim 1 wherein each of said electrical-conducting members comprises an electrical-conductive tape.

6. The rodent guard system of claim 1 wherein one of said electrical-conducting members is negative and the other electrical-conducting member is positive.

7. The rodent guard system of claim 1 wherein said source of electrical energy comprises an electric fence controller.

8. The rodent guard system of claim 1 wherein said barrier members are comprised of a plastic material.

9. The rodent guard system of claim 1 wherein said barrier members are comprised of a rubber material.

10. The rodent guard system of claim 1 wherein said barrier members are comprised of a highly visible material.

11. The rodent guard system of claim 1 wherein said barrier members are comprised of a fluorescent material.

12. The rodent guard system of claim 1 wherein said source of electrical energy is 115 volt AC input and is low voltage.

13. The rodent guard system of claim 1 wherein said upstanding barrier member has an inclined upper end.

14. The rodent guard system of claim 13 wherein said inclined upper end faces outwardly from the predetermined area.

15. A system for inhibiting rodents or insects from entering a predetermined area on a surface, comprising:

a perimeter fence positioned on the surface and extending around the predetermined area;

at least first and second electrical-conducting, elongated members positioned on said perimeter fence;

a source of electrical energy operatively electrically connected to said first and second electrical-conducting members;

said first and second electrical-conducting, elongated members spaced along their entire lengths and operable to complete a circuit across said members through the body of the rodent or the like as the rodent or the like attempts to traverse the electrical-conducting members on the perimeter fence.

16. The system of claim 15 wherein said perimeter fence includes an upstanding portion.

17. The system of claim 15 wherein said perimeter fence comprises a plurality of fence segments.

18. The system of claim 15 wherein said perimeter fence is comprised of a non-electrical conductive material.

19. The system of claim 15 wherein each of said electrical-conducting members comprises an electrical-conductive tape.

20. The system of claim 15 wherein said first electrical-conducting member is negative and said second electrical-conducting member is positive.

21. The system of claim 15 wherein said source of electrical energy comprises an electric fence controller.

22. The system of claim 15 wherein said perimeter fence is comprised of a plastic material.

23. The system of claim 15 wherein said perimeter fence is comprised of a rubber material.

24. The system of claim 15 wherein said perimeter fence is comprised of a highly visible material.

25. The system of claim 15 wherein said perimeter fence is comprised of a fluorescent material.

26. The system of claim 15 wherein said source of electrical energy is 115 volt AC input and is low voltage.

* * * * *